No. 763,700. PATENTED JUNE 28, 1904.
C. G. STREICH.
FRONT GEAR FOR VEHICLES.
APPLICATION FILED DEC. 21, 1903.
NO MODEL. 2 SHEETS—SHEET 1.

Witnesses.
C. H. Keeney.
Anna F. Schmidtbauer.

Inventor.
Charles G. Streich,
By Benedict & Morsell
Attorneys.

No. 763,700. PATENTED JUNE 28, 1904.
C. G. STREICH.
FRONT GEAR FOR VEHICLES.
APPLICATION FILED DEC. 21, 1903.
NO MODEL. 2 SHEETS—SHEET 2.
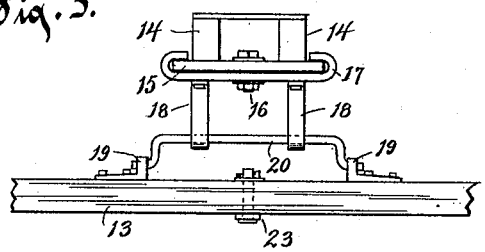
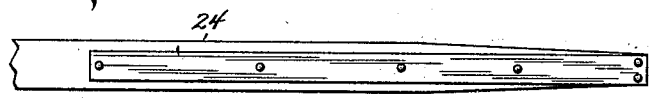
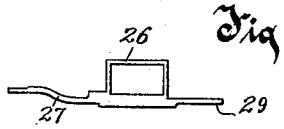
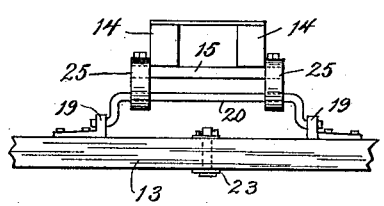
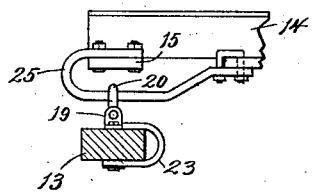
Witnesses.
C. N. Keeney,
Anna F. Schmidtbauer
Inventor.
Charles G. Streich,
By Benedict and Morsell
Attorneys.

No. 763,700. Patented June 28, 1904.

UNITED STATES PATENT OFFICE.

CHARLES G. STREICH, OF OSHKOSH, WISCONSIN.

FRONT GEAR FOR VEHICLES.

SPECIFICATION forming part of Letters Patent No. 763,700, dated June 28, 1904.

Application filed December 21, 1903. Serial No. 185,978. (No model.)

*To all whom it may concern:*

Be it known that I, CHARLES G. STREICH, residing in Oshkosh, in the county of Winnebago and State of Wisconsin, have invented a new and useful Improvement in Front Gear for Vehicles, of which the following is a description, reference being had to the accompanying drawings, which are a part of this specification.

My invention has relation to improvements in front gear for vehicles, more particularly to that class of front gear covered in Letters Patent of the United States issued to me on December 17, 1901, No. 688,894, wherein provision is made when one of the wheels of the vehicle strikes an obstruction in the road-bed or passes down into a rut for distributing the pulling power necessary to release said wheel from the obstruction or rut equally among all the animals.

One of the main objects contemplated by the present improvements is to provide a construction whereby the evener is permitted to swing up or down, and thereby provide for satisfactory operation notwithstanding any lengthening or stretching of the chains due to wear or other causes, the swinging movement under such circumstances permitting said chains to be pulled tight.

The invention, furthermore, contemplates as an object, in addition to the provision for the swinging up and down of the evener, of means for permitting said evener to move up and down vertically, and thereby allowing the same to properly adjust itself when the vehicle is being hauled up or down hill and also adapting said evener to regulate itself to varying sizes of horses.

With the above primary and other incidental objects in view the invention consists of the devices and parts or their equivalents, as hereinafter set forth.

Figure 1:
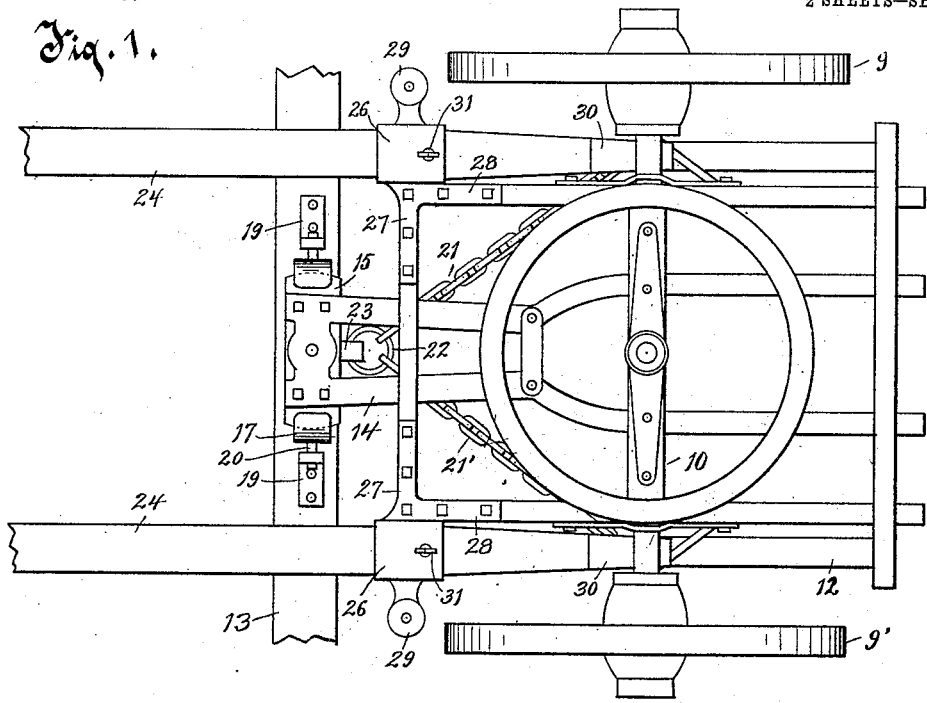
Figure 2:
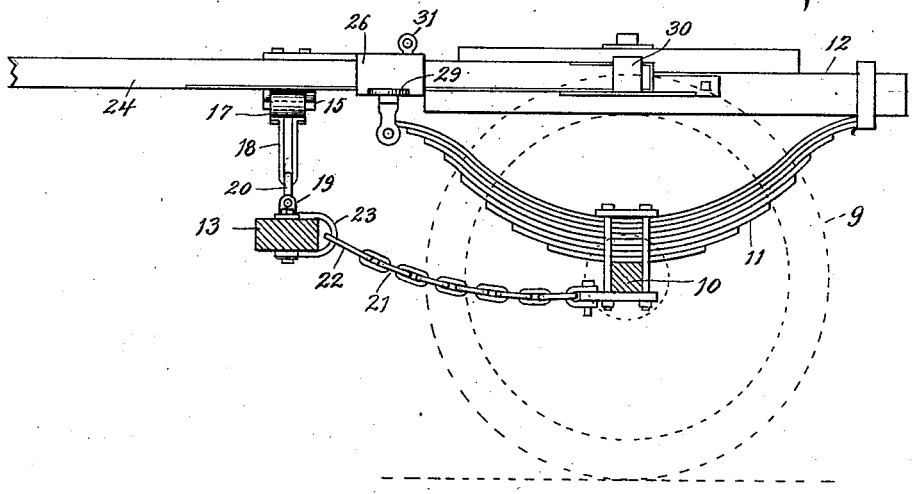

In the accompanying drawings, Figure 1 is a plan view of a front gear for vehicles embodying my improvements. Fig. 2 is a central longitudinal section of Fig. 1. Fig. 3 is a front view of a fragment of the evener and related parts. Fig. 4 is a detail view of one of the poles, the front box thereof being in section. Fig. 5 is a fragmentary view of the rear end of the pole. Fig. 6 is a detail view of one of the front boxes. Fig. 7 is a fragmentary front view of the evener, showing a modified form of suspending device therefor; and Fig. 8 is an end view of Fig. 7.

Referring to the drawings, the numerals 9 9' indicate the front wheels; 10, the axle; 11, the spring, and 12 the main portion of the frame of the front gear.

The numeral 13 indicates a movable evener-bar which is adapted to be supported from a fixed portion of the frame. In the form of construction shown in Figs. 1 to 3 of the drawings this evener is so suspended as to be capable of a lateral sliding movement, an up-and-down swinging movement, and a vertical movement up and down. To provide for these several movements, I secure to the under side of the hounds 14 a plate 15. Pivoted centrally to this plate 15 on a pivot-bolt 16 is an under plate 17, the opposite ends of said under plate being curved around the ends of the plate 15 and extended a short distance over the upper side of said plate. To the under side of plate 17 are secured hanger-straps 18, of elongated U form, with the bends of the loops lowermost. While I have shown two of these hangers, yet only one may be employed or more than two, if desired. If only one is used, it is desirable that it should have considerable width. Secured to the upper side of the evener-bar are lugs 19 19, provided with openings which receive and form bearings for the ends of a bar 20, said bar extending through the loops formed by the U-shaped hangers.

The numerals 21 21' indicate the draft-chains or other suitable connecting devices. The forward ends of these chains are connected to a ring 22, and the ring in turn is connected to a clevis 23, which clevis straddles the evener and is bolted thereto at a central point. The chains diverge from the ring 22, and their rear ends are connected to the axle 10, the connecting-points being near the wheels.

The gearing illustrated in Fig. 1 is designed for the attachment thereto of three horses, and the evener, therefore, in such form would have three whiffletrees (not shown) connected thereto, the intermediate whiffletree being connected to the evener at a point between the two poles or thills 24 24 and the outer whiffletrees to the evener at points beyond the outer sides of the poles or thills and so as to position the central horse between the poles and the outside horses outside of said poles.

In the operation of the parts thus far described should one of the wheels of the vehicle strike an obstruction in the road-bed or pass into a rut the major portion of the strain would not be thrown on the animal on the side of the vehicle so obstructed, but the draft or strain would be equally distributed on all the horses, and this by reason of the capability of the evener to slide laterally. For instance, if the wheel 9 should strike an obstruction or pass into a rut the chain on the obstructed side of the vehicle will become tight or practically rigid, while the other chain will become slack, and with the continued pull of the animals from the evener 13 said evener will slide in a transverse direction away from the obstructed wheel, and thereby all draft will be exerted directly from said obstructed wheel, and when the wheel is passing over the obstruction or out of the rut the opposite chain, which was before loose, immediately becomes tight and the chain which was before tight becomes slack, while the evener slides in the opposite direction to that first explained. In this manner the pull of the animals is equally distributed and at the same time whipping of the pole is entirely avoided. Of course if the wheel 9' should become obstructed the reverse operation takes place.

Besides accomplishing the above function my present improvements, by reason of the provision of the crank-bar 20, permit the evener to swing up, and thereby draw the chains 21 21' tight should they become slack by reason of wear, and hence it follows that the equalization of the pulling power of the animal when a wheel of the vehicle strikes an obstruction or passes into a rut is obtained notwithstanding the slackening of the chains from wear or other causes. It will be noticed that the evener-bar can swing upwardly on the pivots afforded by the passing of the ends of the rod 20 into the bearings 19 or by the pivot afforded by the rod 20 resting loosely in the lower bends of the hangers 18.

My present improvements furthermore provide for the evener raising or lowering in order to adjust itself not only to varying-sized horses, but also to inequalities in the roadbed or to an up-and-down grade in the roadbed—as, for instance, a steep elevation or hill. In such case the bar 20 will raise or lower in the loops formed by the hangers 18 and carry the evener-bar therewith, and consequently said evener-bar is automatically adjusted to such variations. By reason of the provision of the pivot-bolt 16 the evener-bar is also permitted to swing horizontally, and thereby secure freedom in turning.

The modified form of construction illustrated in Figs. 7 and 8 has all the movements of the evener-bar illustrated in Figs. 1 to 3, inclusive, and in addition thereto has a straight or sliding backward-and-forward movement. The up-and-down or vertical movement of this modified form of construction, however, is more limited than the up-and-down or vertical movement in the other form of construction, and consequently this modified form is more applicable to ordinary streets or to sections of country devoid of hills or elevations and to ordinary sizes of horses. Referring to this modified form of construction, the hounds 14 have connected to their under sides the plate 15; but the under pivoted plate 17 is omitted. The opposite ends of plate 15 extend laterally a slight distance beyond the hounds and have secured thereto the ends of straps 25 25, said straps being curved forwardly and thence bent rearwardly beneath and below the hounds and thence bent upwardly and secured to the under sides of said hounds. The bar 20 extends over the straight under portions of the straps 25 and is consequently free to slide laterally thereover and carry the evener-bar in the same direction. The evener-bar is also capable of swinging up and down on the pivots afforded by the engagement of the ends of the bar 20 with the bearings 19 and by the engagement of the main portion of said bar with the straight under portions of the straps 25 and also an up-and-down or vertical movement permitted by the play of the rod 20 above the straps 17. Attention is also directed to the fact that in this modified form the evener-bar is capable of a forward-and-rearward movement, by reason of the fact that the bar 20 is slidable forwardly and rearwardly on the straight portions of the straps 25.

The drawings also show means for attaching the thills or poles in such manner as to make them readily interchangeable, so that in case a pole bends downwardly, as frequently occurs, said pole can be removed from its boxes or sockets and turned upside down, or with the concavity or deflection of the bend uppermost, while the other pole can be inserted in the sockets formerly occupied by the first-referred-to pole. It is a well-known fact that the poles of a vehicle on account of their own weight and the weight of the chains frequently bend downwardly to such an extent as to strike the legs of the horses. Heretofore when this has occurred it has been customary to entirely remove the bent pole and substitute another straight pole therefor—obviously an expensive expedient, which my construction now about to be described entirely obviates. Referring to this construction, the front boxes for the poles are indicated by the numerals 26 26. These boxes are preferably connected to the main portion of the frame 12 by means of arms, one of said arms, 27, extending from the inner side of each box and bolted or otherwise secured to the forward bar of the frame, and the other arm, 28, extending rearwardly and bolted or otherwise secured to the side bar of the frame. For convenience the steps 29 29 of the vehicle may project laterally from the outer sides of these boxes. Located in line with and to the rear of the front boxes and secured to the sides of the frame just above the axle are rear boxes or sockets 30 30. The front and rear boxes are in line centrally axially, and said boxes have square angles. The poles or thills 24 are passed through the front boxes and pushed rearwardly until their rear ends enter the rear boxes, and when the poles are so engaged they are removably held in place by means of pins 31, passed through openings in the front boxes and registering openings in the poles. The pins, if desired, may have short chains attached thereto, said chains being also attached to the poles in order to prevent the pins from being lost. From the fact that there is but a limited space for the rear boxes 30 they are required to be smaller than the front boxes in order to secure the alinement, and hence it is necessary to taper the rear portions of the poles on opposite lateral sides thereof, as most clearly shown in Fig. 1. From the construction described it will be evident that when a pole bends downwardly from any cause the said pole can be readily removed by taking out the pin 31, the said pole then turned upside down or with the concavity of the bend or deflection uppermost and said pole in such position then inserted in the boxes on the other side of the vehicle after first removing the pole from that side, and the latter pole is then inserted in the sockets from which the first-referred-to pole was removed. It is necessary that the bent pole should be transferred from one side of the vehicle to the other, inasmuch as should it be turned upside down and inserted in the same sockets which it previously occupied the rings and other connections carried thereby would be incorrectly positioned. From the fact that the boxes or sockets have square angles and are in line centrally axially the changing of the poles in the manner above pointed out, so as to rectify bends therein, can be readily accomplished.

What I claim as my invention is—

1. The combination of a frame, an axle, an evener-bar carried by the frame, and constructed to have a sliding movement transversely of the frame, and an up-and-down swinging movement, and draft-chains having their rear ends connected, respectively, to the front axle near opposite ends of said axle, and their forward ends converged and connected to a central point of the evener-bar.

2. The combination of a frame, an axle, an evener-bar carried by the frame and constructed to have a sliding movement transversely of the frame and a vertical up-and-down movement, and draft-chains having their rear ends connected, respectively, to the front axle near opposite ends of said axle, and their forward ends converged and connected to a central point of the evener-bar.

3. The combination of a frame, an axle, an evener-bar carried by the frame and constructed to have a sliding movement transversely of the frame, an up-and-down swinging movement, and a vertical up-and-down movement, and draft-chains having their rear ends connected, respectively, to the front axle near opposite ends of said axle, and their forward ends converged and connected to a central point of the evener-bar.

4. The combination of a frame, an axle, an evener-bar carried by the frame and constructed to have a sliding movement transversely of the frame, an up-and-down swinging movement, and a forward-and-rearward sliding movement, and draft-chains having their rear ends connected, respectively, to the front axle near opposite ends of said axle, and their forward ends converged and connected to a central point of the evener-bar.

5. The combination of a frame, an axle, a hanger depending from the frame, an evener-bar, a guide-bar pivoted at opposite ends to the evener-bar and extending through the loop of the hanger, and draft-chains having their rear ends connected, respectively, to the front axle near opposite ends of said axle, and their forward ends converged and connected to the evener-bar.

6. The combination of a frame, an axle, a plurality of hangers depending from the frame, an evener-bar, a guide-bar pivoted at opposite ends to the evener-bar and extending through the loops of the hangers, and draft-chains having their rear ends connected, respectively, to the front axle near opposite ends of said axle, and their forward ends converged and connected to the evener-bar.

7. The combination of a frame, an axle, an evener-bar carried by the frame and constructed to have a sliding movement transversely of the frame, an up-and-down swinging movement, and a forward-and-rearward movement, and draft-chains having their rear ends connected, respectively, to the front axle near opposite ends of said axle, and their forward ends converged and connected to a central point of the evener-bar.

8. The combination of a frame, an axle, and an evener-bar carried by the frame, and constructed to have an up-and-down swinging movement.

9. The combination of a frame, an axle, and an evener-bar carried by the frame and constructed to have a vertical up-and-down movement.

In testimony whereof I affix my signature in presence of two witnesses.

CHARLES G. STREICH.

Witnesses:
ANNA F. SCHMIDTBAUER,
A. L. MORSELL.